(12) United States Patent
Harbarth et al.

(10) Patent No.: US 7,546,282 B2
(45) Date of Patent: Jun. 9, 2009

(54) METHOD FOR SEARCHING WITHIN ELEMENTS IN A HIERARCHICALLY STRUCTURED DATABASE

(75) Inventors: Jürgen Harbarth, Darmstadt (DE); Kay Hans-Peter Winkler, Darmstadt (DE); Harald Ralf Schöning, Dieburg (DE)

(73) Assignee: Software AG, Darmstadt (DE)

( * ) Notice: Subject to any disclaimer, the term of this patent is extended or adjusted under 35 U.S.C. 154(b) by 445 days.

(21) Appl. No.: 11/010,506

(22) Filed: Dec. 13, 2004

(65) Prior Publication Data

US 2005/0131895 A1 Jun. 16, 2005

(30) Foreign Application Priority Data

Dec. 16, 2003 (EP) ................................ 03028668

(51) Int. Cl.
*G06F 7/00* (2006.01)
*G06F 17/30* (2006.01)
(52) U.S. Cl. ..................................... 707/1; 707/2; 707/3
(58) Field of Classification Search ................. 707/1–6, 707/7, 103 R, 103 Y, 103 Z, 206, 100–102
See application file for complete search history.

(56) References Cited

U.S. PATENT DOCUMENTS

| | | | | |
|---|---|---|---|---|
| 5,418,942 | A * | 5/1995 | Krawchuk et al. | 707/3 |
| 5,592,667 | A * | 1/1997 | Bugajski | 707/102 |
| 6,085,188 | A * | 7/2000 | Bachmann et al. | 707/3 |
| 6,347,312 | B1 * | 2/2002 | Byrne et al. | 707/3 |
| 6,567,812 | B1 * | 5/2003 | Garrecht et al. | 707/100 |
| 6,625,615 | B2 * | 9/2003 | Shi et al. | 707/103 R |
| 6,643,642 | B1 * | 11/2003 | Habegger | 707/5 |
| 6,738,759 | B1 * | 5/2004 | Wheeler et al. | 707/3 |
| 7,051,030 | B2 * | 5/2006 | Kitain et al. | 707/10 |
| 2002/0103829 | A1 | 8/2002 | Manning et al. | 707/513 |

(Continued)

FOREIGN PATENT DOCUMENTS

WO WO 01/33433 A1 5/2001

OTHER PUBLICATIONS

European Search Report, Application No. 03028668.6, Mailed May 12, 2004.

(Continued)

*Primary Examiner*—Don Wong
*Assistant Examiner*—Merilyn P Nguyen
(74) *Attorney, Agent, or Firm*—Meyertons Hood Kivlin Kowert & Goetzel, P.C.; Jeffrey C. Hood

(57) ABSTRACT

Searching within elements of a hierarchically structured database. Each element may include one or more hierarchically structured nodes for defining attributes of the element. One or more nodes of the searched element may fulfill one or more search conditions ($c_0, c_i, ..$).

Figures 6, 7:
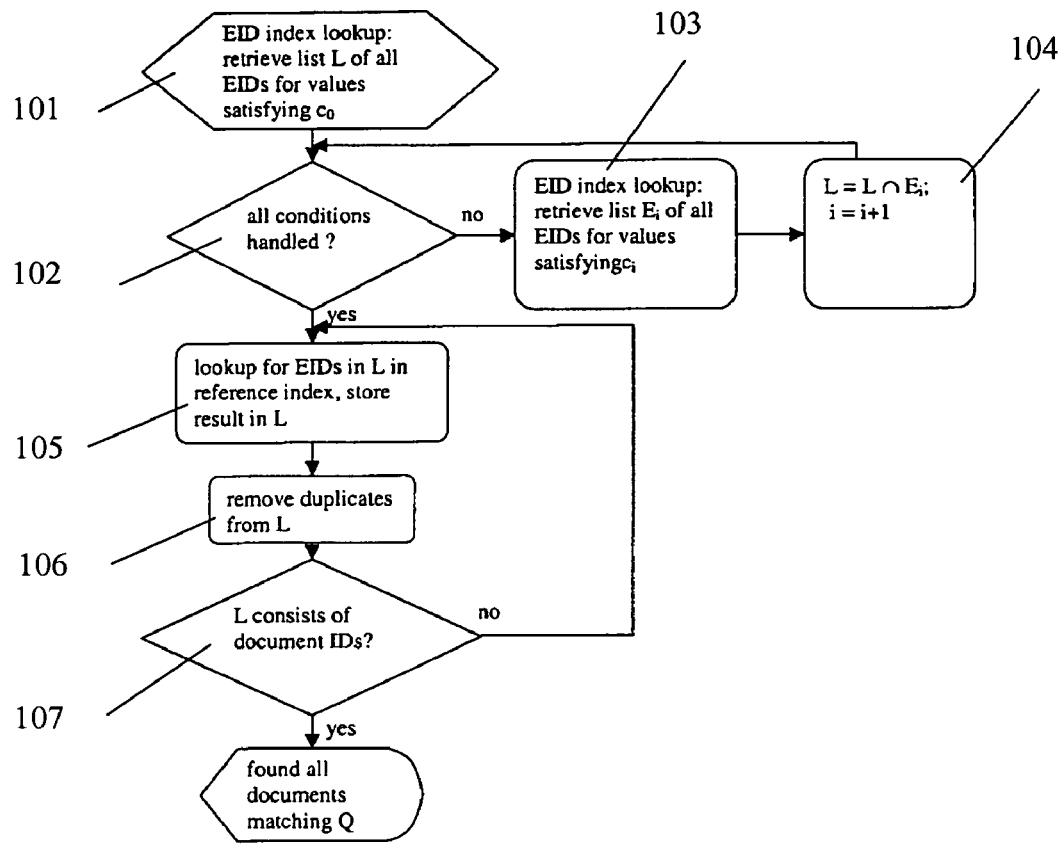

A plurality of codes may be searched and a unique identifier (EID) may be assigned to each of the selected nodes.

A reference index may be created that allows to derive for each unique identifier (EID) of a selected node the corresponding element of the database.

A set ($L, E_i$) of unique identifiers may be retrieved for each of the one or more search conditions for ancestor nodes, which fulfill the respective search condition.

A final set of unique identifiers may be obtained.

The searched elements of the database may be retrieved based on the final set of unique identifiers and the reference index.

15 Claims, 6 Drawing Sheets

U.S. PATENT DOCUMENTS

2002/0138471 A1* 9/2002 Dutta et al. ............... 707/3
2002/0147711 A1 10/2002 Hattori et al.
2002/0161781 A1* 10/2002 Leong et al. ............ 707/103 R
2006/0074857 A1* 4/2006 Etzold et al. ............... 707/3

OTHER PUBLICATIONS

European Search Report, Application No. 03028668.6, Mailed May 12, 2004.

* cited by examiner

Fig. 1

```
<?xml version="1.0"?>
<book id="1">
  <author><firstname>John</firstname><lastname>Miller</lastname></author>
  <author><firstname>Jim</firstname><lastname>Smith</lastname></author>
  <title>XML in electronic business</title>
  <chapter number="1"><title>electronic business</title><text></text></chapter>
  <chapter number="2"><title>XML basis</title><text></text></chapter>
  <chapter number="3"><title>web services</title><text></text></chapter>
</book>
and
<?xml version="1.0"?>
<book id="2">
  <author><firstname>Jim</firstname><lastname>Miller</lastname></author>
  <author><firstname>Laura</firstname><lastname>Smith</lastname></author>
  <title>More about XML</title>
  <chapter number="1"><title>XML standards</title><text>The most basic standard
  documents are XML 1.0, XML namespaces, ...</text></chapter>
    <chapter number="2"><title>advanced XML</title><text></text></chapter>
    <chapter number="3"><title>the future of XML</title><text></text></chapter>
</book>
and
<?xml version="1.0"?>
<book id="3">
  <author><firstname>Mary</firstname><lastname>Jones</lastname></author>
  <author><firstname>Jim</firstname><lastname>Smith</lastname></author>
  <title>XML in databases</title>
  <chapter number="1"><title>XML basics</title><text>the extensible markup language
  uses namespaces to ...</text></chapter>
    <chapter number="2"><title>XML standards</title><text>...</text></chapter>
    <chapter number="3"><title>XML in databases</title><text>...</text></chapter>
</book>
```

— 10

Fig. 2

```
<?xml verson="1.0"?>
<book id="1">
...
  <chapter number="1">...</chapter>           EID=17   EID=98
  <chapter number="2">...</chapter>
  <chapter number="3">...</chapter>
</book>                                        EID=19

<?xml verson="1.0"?>
<book id="2">                                  EID=57   EID=78
  <chapter number="1">...</chapter>
  <chapter number="2">...</chapter>                     EID=99
  <chapter number="3">...</chaper>
</book>

<?xml verson="1.0"?>
<book id="3">
...                                            EID=66   EID=69
  <chapter number="1">...</chapter>
  <chapter number="2">...</chapter>
  <chapter number="3">...</chaper>                      EID=91
</book>
```

Fig. 3

20

| EID | points to |
|---|---|
| 17 | Document ID 1 |
| 19 | Document ID 1 |
| 57 | Document ID 2 |
| 66 | Document ID 3 |
| 69 | Document ID 3 |
| 78 | Document ID 2 |
| 91 | Document ID 3 |
| 98 | Document ID 1 |
| 99 | Document ID 2 |

Fig. 4

31

| words in the node "text" | EID |
|---|---|
| 1.0 | 57 |
| are | 57 |
| basic | 57 |
| documents | 57 |
| extensible | 66 |
| language | 66 |
| markup | 66 |
| most | 57 |
| namespaces | 57, 66 |
| standard | 57 |
| the | 57, 66 |
| to | 66 |
| uses | 66 |
| XML | 57 |

Fig. 5

32

| words in the node "title" | EID |
|---|---|
| advanced | 78 |
| basics | 66 |
| basis | 98 |
| business | 17 |
| databases | 91 |
| electronic | 17 |
| future | 99 |
| in | 91 |
| of | 99 |
| services | 19 |
| standards | 57, 69 |
| the | 99 |
| web | 19 |
| XML | 57, 66, 69, 78, 91, 98, 99 |

```
<xs:element name = "title" type = "xs:string">
    <xs:annotation>
        <xs:appInfo>
            <tsd:elementInfo>
                <tsd:physical>
                    <tsd:native>
                        <tsd:index>
                            <tsd:text>
                                <tsd:refers>/book/chapter</tsd:refers>
                            </tsd:text>
                        </tsd:index>
                    </tsd:native>
                </tsd:physical>
            </tsd:elementInfo>
        </xs:appinfo>
    </xs:annotation>
</xs:element>
```

Fig. 9 sample XML document
```
<book>
    <author>
        <name>
            <firstname>Joe</firstname>
            <lastname>Miller</lastname>
        </name>
    </author>
    <author>
        <name>
            <firstname>Jim</firstname>
            <lastname>Smith</lastname>
        </name>
    </author>
</book>
```
corresponding XML schema:
```
<xs:schema xmlns:xs="http://www.w3.org/2001/XMLSchema" elementFormDefault="qualified">
    <xs:element name="author">
        <xs:complexType>
            <xs:sequence>
                <xs:element ref="name"/>
            </xs:sequence>
        </xs:complexType>
    </xs:element>
    <xs:element name="book">
        <xs:complexType>
            <xs:sequence>
                <xs:element ref="author" maxOccurs="unbounded"/>
            </xs:sequence>
        </xs:complexType>
    </xs:element>
    <xs:element name="firstname">
        <xs:simpleType>
            <xs:restriction base="xs:string">
                <xs:enumeration value="Jim"/>
                <xs:enumeration value="Joe"/>
            </xs:restriction>
        </xs:simpleType>
    </xs:element>
    <xs:element name="lastname">
        <xs:simpleType>
            <xs:restriction base="xs:string">
                <xs:enumeration value="Miller"/>
                <xs:enumeration value="Smith"/>
            </xs:restriction>
        </xs:simpleType>
    </xs:element>
    <xs:element name="name">
        <xs:complexType>
            <xs:sequence>
                <xs:element ref="firstname"/>
                <xs:element ref="lastname"/>
```

Fig. 10

```
<book>
    <chapter>
        <title>Introduction</title>
        <numberOfPages>32</numberOfPages>
    </chapter>
    <chapter>
        <title>Conclusions</title>
        <numberOfPages>3</numberOfPages>
    </chapter>
</book>
```

Fig. 11a (PRIOR ART)

| | |
|---|---|
| Jim | 1,2,3 |
| John | 1 |
| Laura | 2 |
| Mary | 3 |

Fig. 11b (PRIOR ART)

| | |
|---|---|
| Jones | 3 |
| Miller | 1,2 |
| Smith | 1,2,3 |

METHOD FOR SEARCHING WITHIN ELEMENTS IN A HIERARCHICALLY STRUCTURED DATABASE

1. TECHNICAL FIELD

The present invention relates to a method for searching in a hierarchically structured database. In addition, the present invention relates to a hierarchically structured database, which allows a facilitated searching of its elements.

2. THE PRIOR ART

Databases are nowadays a common technical tool for managing large amounts of data. Hierarchically structured databases are characterized in that the entries are arranged in a hierarchy, which can, for example, be imagined as a tree-like structure comprising a root, branches, sub-branches etc. For example the books of a library can be managed using a hierarchical database. Each element of the database, i.e. each book, has several attributes such as the title, the author, the chapters in the book, etc. These attributes may in turn have sub-attributes, e.g. the name of the author, his/her address, the text of a chapter, etc. In a hierarchically structured database the attributes and the sub-attributes form so-called nodes of the hierarchy.

One object of a database is to facilitate the retrieval of its elements. For example a user of a library may want to quickly find a certain book in the library based on the first name and the last name of its author. Hierarchically structured databases, as they are known in the prior art comprise to this end often one or more indexes, which correlate the values of certain nodes with identifiers of the elements of the data base and thereby allow a very fast search for elements of the database based on a condition for a node of the searched elements. This is, since the index itself, which is derived from the database, yields the search result and the elements of the database do not each have to be inspected. This saves time and processing costs.

The prior art search technique is illustrated in FIGS. 1, 11a and 11b: FIG. 1 shows a simplified example of three elements of a XML based database for books 1-3. Each element comprises several attributes indicating the author, his first name and last name, the chapters of the book including title and text etc. . . . FIGS. 11a and 11b present two exemplary index tables 201, 202, one for the first names of the authors of books in the library (201, FIG. 11a), the other for last names of the authors (202, FIG. 11b). If a user searches for books written by an author with the last name "Jones", the index 202 of FIG. 11b will immediately lead to the result that book 3 is the desired one.

However, data base queries are typically more complicated and may comprise two or more conditions. For example, a search might be directed to books of the author "Jim Miller" in the database of FIG. 1. Using the prior art indexes, the index 201 for the attribute "first name" in FIG. 11a would at first be searched yielding the set of books 1, 2 and 3. Subsequently, the index 202 in FIG. 11b for the attribute "last name" would be searched leading to the set of books 1 and 2. The intersect of the two sets of books, which should meet both conditions of the query, are the books 1 and 2. However, an inspection of the data base elements in FIG. 1 shows, that only book 2 is a correct result. The reason is that a book may be written by several authors, one of which has the first name "Jim" and another has the last name "Miller".

One way to overcome this difficulty could be to provide a compound index, for example by correlating the combined first name and the last name of the author with the books of the database. However, if other search criteria are used than the quite limited number of the names of the authors, for example if the title of a chapter of the desired book and a word of the text in this chapter are the search criteria, such a compound index would lead to a huge number of index entries. This is, since each word in the text of the chapter would together with the title have to be combined for an entry of the compound index. It is evident that such an approach would again lead to long very long search times and high processing costs of a database query.

It is therefore the problem of the present invention to provide a method for searching a database and a database itself which allow a fast and efficient searching even for combined queries in order to overcome the above described disadvantages of the prior art.

3. SUMMARY OF THE INVENTION

This problem is solved by a method for searching within elements of a hierarchically structured database, wherein each element has one or more hierarchically structured nodes for defining attributes of said element and wherein one or more nodes of the searched element must fulfill one or more search conditions, the method comprising the steps of a. selecting a plurality of nodes and assigning a unique identifier to each of the selected nodes;

b. creating a reference index, that allows to derive for each unique identifier of a selected node the corresponding element of the database;

c. for each of the one or more search conditions:
retrieving a set of unique identifiers for ancestor nodes of nodes, which fulfill the respective search condition;

d. intersecting the sets to obtain a final set of unique identifiers; and e. retrieving the searched elements of the database based on the final set of unique identifiers and the reference index.

In contrast to the prior art, wherein search indexes were directly related to the searched elements of the database, the present invention uses the concept of unique identifiers. This allows to manage complex queries with unlimited numbers of conditions even at different levels of the hierarchy of the data base. Further, whereas the above mentioned use of compound indexes for complex queries with more than one condition requires a substantial amount of pre-planning, the method of the present invention provides a by far more flexible method to obtain results for searches with one or more conditions.

The retrieving of step c. comprises preferably the use of one or more search indexes, which correlate unique identifiers of ancestor nodes with nodes, which can be the subject of the one or more search conditions. Since such indexes can be quickly searched, the sets of unique identifiers and thereby the final set, which is an intersection of these sets, can be obtained in a comparatively short time.

The reference index points preferably for each unique identifier either directly to the related database element or to a unique identifier of a node, which is an ancestor to the node of the originating unique identifier. As a result, the elements of the data base, which correspond to the intersect of unique identifiers of method step d. can be either directly or indirectly (i.e. with a recurrent use of the reference index) obtained.

In order to reduce the overhead of the method, it is preferred if a unique identifier is only assigned to a node, if there are several nodes on the same hierarchy level.

This does not restrict the applicability of the described search method. Rather than using the unique identification of an ancestor node, which occurs only once, the nearest ancestor node which occurs more than once can be used to obtain the same result of the search. As a consequence, also no search index is necessary for correlating a unique identifier of a node, which occurs only once. Further, it is preferred that a unique identifier is only assigned to a node, if child nodes of said node are expected to be the subject matter of the one or more search conditions.

In a preferred embodiment the unique identifier is a unique number and the database is preferably an XML based database.

According to a further aspect, the present invention relates to a database with a plurality of elements comprising:
a. a plurality of hierarchically structured nodes describing attributes of the elements of the database
b. a plurality of unique identifiers assigned to selected nodes;
c. a reference index, that allows to derive for each unique identifier of a selected node the corresponding element of the database;
d. one or more search indexes, which list unique identifiers for ancestor nodes of nodes, which can be the subject of the one or more search conditions.

Further dependent claims relate to preferred embodiments of the data base.

4. SHORT DESCRIPTION OF THE DRAWINGS

Figure 8:
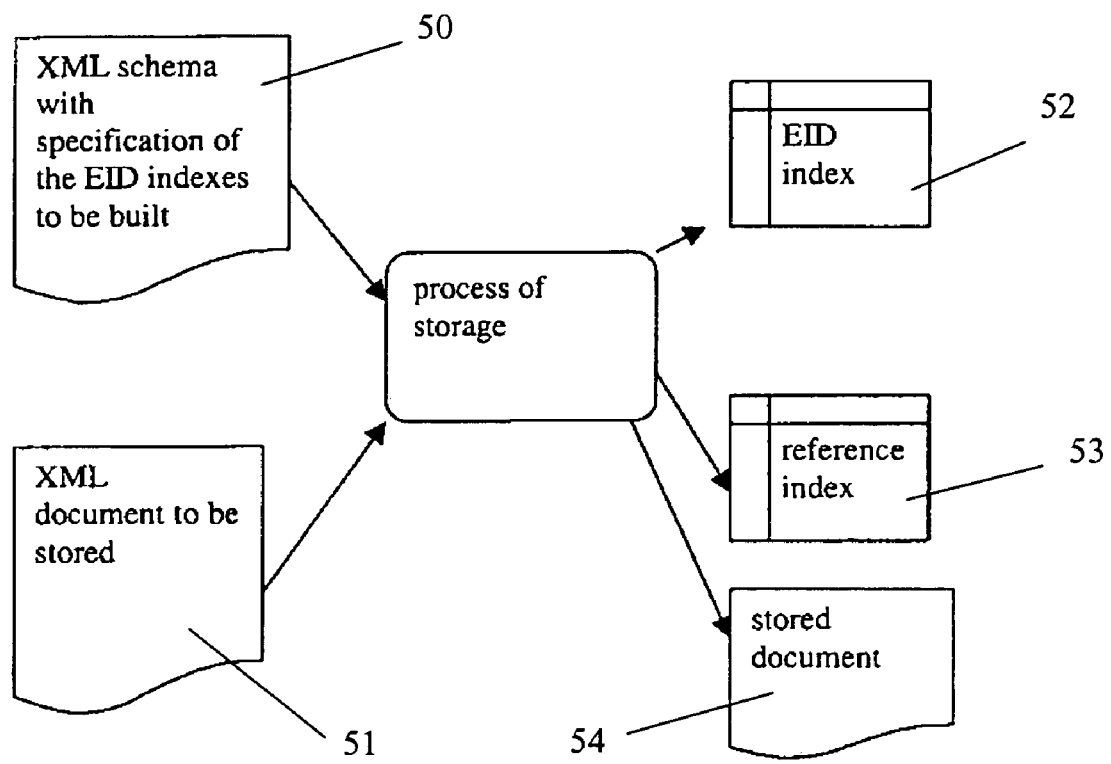

In the following detailed description presently preferred embodiments of the invention are described with reference to the drawing which shows:

FIG. 1: An example of a hierarchical database for books 1-3;

FIG. 2: an exemplary assignment of unique identifiers to nodes of the database of FIG. 1;

FIG. 3: the reference index for the unique identifiers of the database of FIGS. 1 and 2;

FIGS. 4 and 5: examples for search indexes for nodes which can be the subject of one or more search conditions;

FIG. 6: a flow chart describing a preferred embodiment of the present invention;

FIG. 7: an example of an XML schema for implementing a search index;

FIG. 8: a schematic representation of the process of building a database according to a preferred embodiment of the present invention;

FIG. 9: a sample XML document and a corresponding XML schema for illustrating the appropriate assignment of unique identifiers;

FIG. 10: an XML Document illustrating when application semantics will cause the omission of the assignment of unique identifiers; and FIG. 11a,b: two search indexes for searching a database according to the prior art.

5. DETAILED DESCRIPTION OF PREFERRED EMBODIMENTS

In the following a presently preferred embodiment of the method and the database according to the invention are described with reference to a database in the form of a hierarchically structured XML document. However, it is to be understood that the present invention is not restricted to this specific markup language for structuring documents but may be applied to any kind of data having a tree-like hierarchical structure. In addition, it is worth to note that the present invention can be combined with prior art search methods and databases, in particular the technique described in the introductory part of the present application.

FIG. 1 shows the already mentioned simplified example of a database 10 comprising three books (book id=1, 2, 3). The method and the database according to the invention are in the following described with reference to a query in the database 10 for a book, which has for example a chapter with a title containing the word "standards", while the text of this chapter contains the word "namespaces".

For performing the search, the database 10 is provided with unique identifiers, which may be in the form of a unique number called EID, for unambiguously identifying selected nodes of the database 10. This is illustrated in FIG. 2. As can be seen, each chapter of the three books of the database 10 is provided with a unique EID. Once the EIDs have been assigned, a reference index 20 can be set up, which is shown in FIG. 3 and which correlates each assigned EID with the respective element of the database, i.e. the document id of the respective book in the present example.

However, the reference index 20 does not have to point directly to the elements of the database. Alternatively, it may correlate a first EID with a second EID belonging to a node, which is an ancestor to the node identified by the first EID. In this case the respective element of the database can be found by recurrently accessing the reference index 20.

In a further preparatory step, one or more search indexes are set up, which correlate the values of nodes, which can be the subject of search conditions of a query, with the EIDs of ancestors of these nodes. Examples for such EID indexes are shown in FIGS. 4 and 5 in the form of tables, wherein the EID index 31 of FIG. 4 correlates the words in the nodes "text" with the EID of the respective chapter, i.e. the ancestor node of the node text. In the same manner the EID index 32 of FIG. 5 correlates the values of the node "title" with the EID index of the respective chapter. An exemplary XML schema conforming the definition of an EID index is shown in FIG. 7.

Once the database 10 has been prepared by providing the reference index 20 and the EID indexes 31, 32, the initially described complex query for books with chapters having the word "namespaces" in its text and the word "standards" in its title can be carried out. The steps, which are preformed to this end are illustrated in the flow chart of FIG. 6.

In step 101 the EID index corresponding to the first search condition $c_0$ is investigated and a list L containing EIDs of nodes satisfying the condition $c_0$ are retrieved. In the present example the condition $c_0$ is that the word "namespaces" occurs in the text of a chapter of the searched book. This yields a list L containing the EIDs 57 and 66 (cf. FIG. 4).

In step 102 it is checked, whether there are further search conditions $c_i$ to be satisfied. If so, the method continues with step 103, wherein the EID index corresponding to the search condition $c_i$ is investigated to retrieve a further list $E_i$ of EIDs. In the present example the second search condition is that the word "standards" occurs in the title of the chapter. Using the EID index of FIG. 5, a list containing the EIDs 57 and 69 is obtained. In step 104 the two lists L and $E_i$ are intersected, which leads in the present case to a list, which comprises only the EID 57.

If there are no further conditions to be satisfied, the method proceeds to step 105, wherein the EIDs of the resulting list L are transformed into the elements of the database using the reference index 20. This may require in step 107 the decision to perform a recurrent access to the reference index 20, in order to resolve EIDs, which are not directly referenced to a database element but to an ancestor EID, as explained above. Duplicates of the resulting database elements are removed in step 106.

In the present example only the single EID 57 is resolved, which leads to the book with the document id 2 and thereby to the only correct result, since only book 2 contains the word "standards" in the title of a chapter and the word "namespaces" in the text of this chapter, as required by the query (cf. the XML document of the database 10 in FIG. 1).

The described method, which has been explained with reference to a particularly simple example, can also be used for combinations of search conditions on an arbitrary number of nodes without the need to pre-plan these combinations. This is in contrast to the above described prior art approach of a combined index. Further, conditions can relate to nodes at different levels of the database, which adds further to the flexibility for performing complex queries. The described search method is stable under modifications of the database content, i.e. the XML document, because the EIDs are assigned to nodes and not to values of such nodes, which may change on document updates.

The performing of a complex query in the described manner requires a preparation of the database. If a structured XML document is used for the data elements, the necessary processing can be carried out as illustrated in FIG. 8. Both, an XML schema 50 with the specification of the EID indexes to be built and the XML document 51 containing the actual data are stored. The process of storage comprises the creation of one or more EID indexes 52, the creation of the reference index 53 and the storing of the document 54 itself. Once an XML document has been stored in this manner it is ready for the above described efficient processing of complex queries.

A further important aspect of the present invention is the assignment of the EIDs to nodes of the hierarchically structured data base. In order to reduce the overhead for processing complex queries and also the storing of an XML document, it is not necessary to assign an EID to each node in the hierarchy. Rather, it is preferred to restrict the EID assignment to nodes which can occur more than once. This is in the following further explained with reference to FIG. 9.

Whereas the upper part of FIG. 9 presents a sample XML document for a single book, the second part of FIG. 9 displays the underlying XML schema. As can be seen, the book may have several authors (cf. the line "<xs element ref="author" maxOccurs="unbounded"/> in the XML schema of FIG. 9). However, each author has only a single name comprising a single first name and a single last name. Accordingly, a meaningful EID assignment takes this property of the database structure into account and assigns EIDs only to authors and not to names.

Another approach to reduce the overhead in the database is to prepare EID indexes only for nodes, which are likely to be the subject of search conditions. For example for the book, which is represented by the XML document in FIG. 10, it is quite unlikely that there will be a search with conditions on the number of pages and the title of a chapter. Therefore, it will not be necessary to create an EID index for correlating the values of title with chapter EIDs and/or an EID index correlating the values of numberOfPages with EIDs of the chapter. Other situations are also conceivable, wherein application semantics can be used to deduct that certain levels of EID assignment and the creation of corresponding EID indexes can be omitted.

A memory medium may comprise program instructions which are executable to perform the method described above.

The invention claimed is:

1. Method for searching within elements on the same level of a hierarchically structured database, wherein each of the elements has one or more hierarchically structured nodes for defining attributes of said element, and wherein one or more nodes of the searched element must fulfill a plurality of search conditions ($c_0, c_i, \ldots$), the method comprising the following steps:
   a. selecting a plurality of nodes and assigning a unique identifier (EID) to each of the selected nodes;
   b. creating a reference index, that allows to derive for each unique identifier (EID) of a selected node the corresponding element of the database;
   c. for each of the plurality of search conditions ($c_0, c_i, \ldots$): retrieving a set (L, $E_i$) of unique identifiers (EID) of nodes whose descendant nodes, fulfill the respective search condition;
   d. intersecting the sets (L, $E_i$) to obtain a final set (L) of unique identifiers (EID); and
   e. retrieving searched elements based on the final set (L) of unique identifiers (EID) and the reference index.

2. Method according to claim 1, wherein the retrieving in method step c. comprises one or more search indexes, which correlate unique identifiers (EID) of the nodes with descendant nodes, wherein the indexes are usable as a subject of the plurality search conditions ($c_0, c_i, \ldots$).

3. Method according to claim 1, wherein the reference index points for each unique identifier (EID) either directly to its related database element or to a unique identifier (EID) of a node, which is an ancestor to the node of the originating unique identifier (EID).

4. Method according to claim 1, wherein a unique identifier (EID) is only assigned to a node, if there are several nodes on the same hierarchy level as the node.

5. Method according claim 1, wherein a unique identifier is only assigned to a node, if child nodes of said node are expected to be a subject matter of the plurality of search conditions ($c_0, c_i, \ldots$).

6. Method according to claim 1, wherein the unique identifier (EID) is a unique number.

7. Method according to claim 1, wherein the database is an XML based database.

8. Method for searching within elements on the same level of a hierarchically structured database, the method comprising
   a. storing the database in a memory, wherein each of the elements has one or more hierarchically structured nodes for defining attributes of said element, and wherein one or more nodes of the searched element must fulfill a plurality of search conditions;
   b. selecting a plurality of nodes and assigning a unique identifier to each of the selected nodes;
   c. creating a reference index, that allows to derive for each unique identifier of a selected node the corresponding element of the database;
   d. for each of the plurality of search conditions: retrieving a set of unique identifiers of nodes whose descendent nodes fulfill the respective search condition;
   e. intersecting the sets to obtain a final set of unique identifiers; and
   f. retrieving and storing searched elements based on the final set of unique identifiers and the reference index.

9. A memory medium comprising program instructions for searching within elements on the same level of a hierarchically structured database, wherein each of the elements has one or more hierarchically structured nodes for defining attributes of said element, and wherein one or more nodes of the searched element must fulfill one or more search conditions ($c_0, c_i, \ldots$), wherein the program instructions are executable by a processor to implement:
   a. selecting a plurality of nodes and assigning a unique identifier (EID) to each of the selected nodes;

b. creating a reference index, that allows to derive for each unique identifier (EID) of a selected node the corresponding element of the database;

c. for each of the one or more search conditions ($c_0, c_i, \ldots$):

retrieving a set ($L, E_i$) of unique identifiers (EID) of nodes whose descendant nodes fulfill the respective search condition;

d. intersecting the sets (L, Ei) to obtain a final set (L) of unique identifiers (EID); and e. retrieving the searched elements based on the final set (L) of unique identifiers (EID) and the reference index.

10. The memory medium of claim 9, wherein the retrieving in c. comprises using one or more search indexes, which correlate unique identifiers (EID) of the nodes with the descendant nodes, wherein the indexes are usable as a subject of the plurality of search conditions ($c_0, c_i, \ldots$).

11. The memory medium of claim 9, wherein the reference index points for each unique identifier (EID) either directly to its related database element or to a unique identifier (EID) of a node, which is an ancestor to the node of the originating unique identifier (EID).

12. The memory medium of claim 9, wherein a unique identifier (EID) is only assigned to a node, if there are several nodes on the same hierarchy level as the node.

13. The memory medium of claim 9, wherein a unique identifier is only assigned to a node, if child nodes of said node are expected to be a subject matter of the plurality of search conditions ($c0, ci, \ldots$).

14. The memory medium of claim 9, wherein the unique identifier (EID) is a unique number.

15. The memory medium of claim 9, wherein the database is an XML based database.

\* \* \* \* \*

UNITED STATES PATENT AND TRADEMARK OFFICE
CERTIFICATE OF CORRECTION

PATENT NO. : 7,546,282 B2  Page 1 of 1
APPLICATION NO. : 11/010506
DATED : June 9, 2009
INVENTOR(S) : Harbarth et al.

It is certified that error appears in the above-identified patent and that said Letters Patent is hereby corrected as shown below:

Column 6
Line 18, please delete "comprises one or more search indexes" and substitute
-- comprises using one or more search indexes --.

Signed and Sealed this

Twenty-first Day of July, 2009

JOHN DOLL
*Acting Director of the United States Patent and Trademark Office*